UNITED STATES PATENT OFFICE.

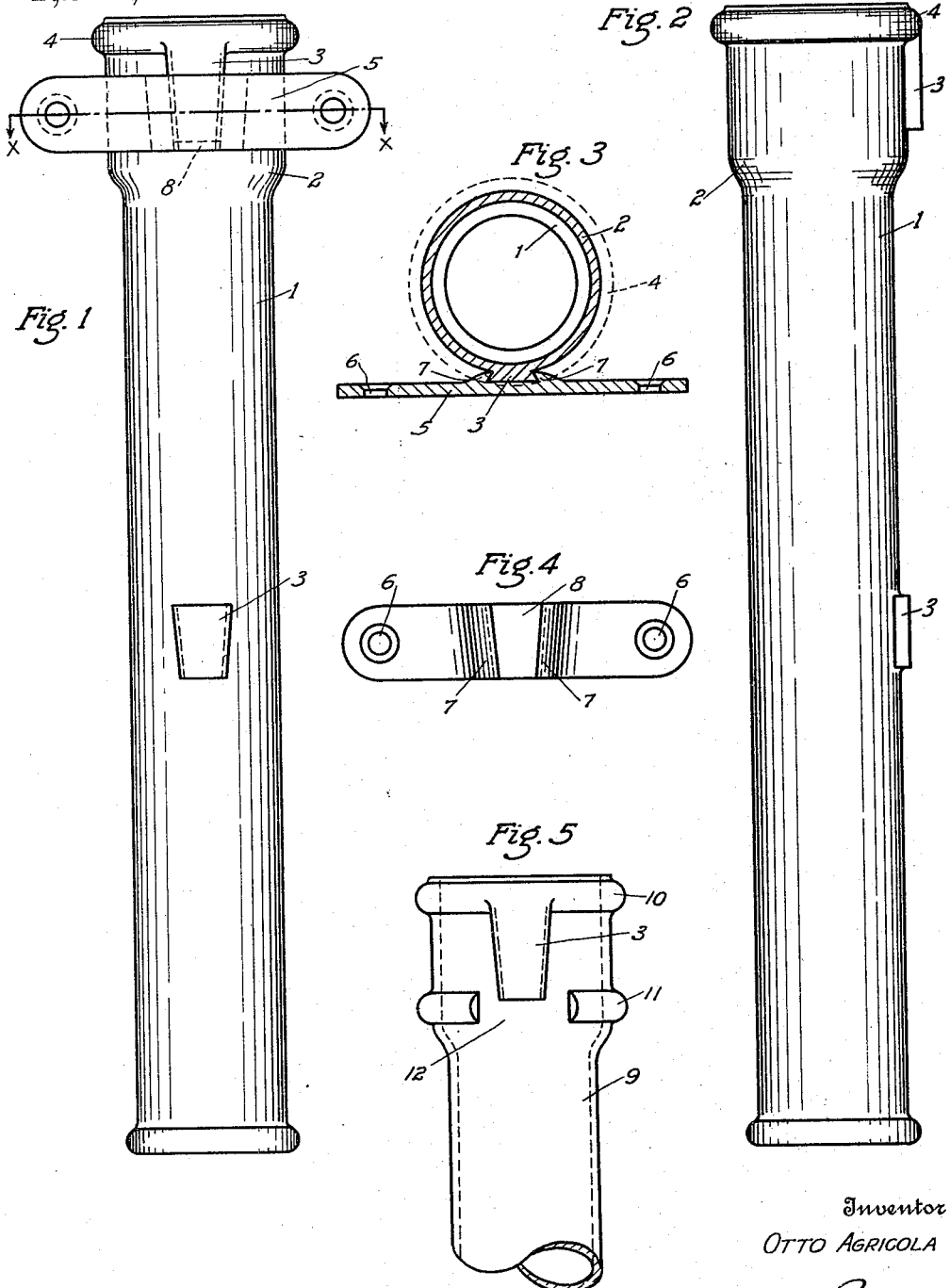

OTTO AGRICOLA, OF GADSDEN, ALABAMA, ASSIGNOR TO COOSA PIPE & FOUNDRY COMPANY, A CORPORATION OF ALABAMA.

CAST-METAL PIPE.

1,201,420.  Specification of Letters Patent.  Patented Oct. 17, 1916.

Application filed May 24, 1915. Serial No. 30,218.

*To all whom it may concern:*

Be it known that I, OTTO AGRICOLA, a citizen of the United States of America, residing at Gadsden, in the county of Etowah and State of Alabama, have invented certain new and useful Improvements in Cast-Metal Pipes, of which the following is a specification.

My invention relates to an improved means for attaching cast iron pipe of the character generally known as rain-water pipe or soil pipe to or suspending it from the walls of houses or structures. Such pipe in accordance with present practice are attached to their supports either by separate straps or ring hangers which surround the pipe and have suitable provision made for attaching them to the walls, or, as is the more general practice in foreign countries, hanger lugs of cast steel or malleable iron are cast-jointed to the pipe hubs. It proved necessary to make these cast lugs of steel or malleable iron to minimize their breakage in shipment, and when the lugs were thus cast-jointed on the pipe it was impossible to nest pipe of different characters for compact shipment.

I have conceived that if the lugs be not permanently jointed to the pipe, certain important advantages will follow, namely, the pipe can be easily packed and can be nested for cheap shipment by water; the hanger lugs themselves can be made of cheap cast iron and thus materially reduce the cost of the pipe as compared with the pipe having the cast steel or malleable iron lugs castjointed thereto; and, by so arranging the lug engaging member on the pipe as to make it not liable to be broken in handling, my pipe will suffer no depreciation in shipment or handling due to the breakage of lugs, and thus I avoid the use of more expensive fastening means to take the place of broken lugs.

With these objects in view I cast a lug upon the pipe preferably on the bell thereof causing it to project slightly therefrom so as to provide undercut side edges for engagement with an undercut socket in the cast iron attaching lug which is provided in its ends with the holes for the retaining screws, bolts or rivets. Both the lug and socket are preferably made tapering with their wider ends toward the hub end of the pipe so that they will interlock effectively and will rigidly support the pipe in position when the attaching lug is made fast to the wall or building. Where the hangers may be required to support the whole weight of the pipe, it is desirable to cast a plurality of alining lugs on the pipe, their number and size being controlled by the weight of the pipe.

In the accompanying drawings I have illustrated what I regard as the preferred embodiment of my invention, and in these drawings:—

Figure 1 illustrates a front view of a cast iron pipe provided with cast lugs and shown with one of the cast detachable hanger lugs interlocked with one of the pipe lugs. Fig. 2 is a side view of Fig. 1. Fig. 3 is a cross sectional view taken on the line $x$—$x$ of Fig. 1. Fig. 4 is an enlarged inside view of the detachable cast lug. Fig. 5 is a view similar to Fig. 1 of the bell end of a rainwater pipe provided with the cast lug according to my invention.

Similar reference numerals refer to similar parts throughout the drawings.

Referring to the construction illustrated in the drawings, 1 is a section of soil pipe having a bell end 2 which is provided on its side face with an integral homogeneous cast lug 3. This lug is preferably, but not necessarily, of the same thickness as a bead 4 surrounding the outer end of the hub and its side walls are undercut and the lug tapers with its widest end toward and preferably merging into the bead 4. The pipe may have one or more of these lugs 3 cast on its body portion and all arranged in longitudinal alinement.

The hanger lug 5, illustrated in Fig. 4, is formed of cast iron having countersunk bolt or screw holes 6 in its ends and having its central portion thickened and provided with a pair of undercut shoulders 7 which between them form a transverse tapering socket 8. This socket is adapted to receive and interlock with a lug 3 and to this end the engaging sides of both the lug 3 and the shoulders 7 are machined to give a snug fit.

In Fig. 5 I illustrate my invention applied to a rain-water pipe 9, the bell end of which is provided with two beads 10 and 11. The lug 3 extends from the bead 10 opposite a notch 12 in the lower bead 11, and it is through this notch 12 that the shoulders 7 of the hanger lug are inserted and moved to interlocking engagement with the lug 3. While I prefer to cast the lug on the pipe, obviously I could reverse the arrangement of parts and cast the socket forming shoulders 7 off the pipe and the lug 3 on the hanger 5.

In utilizing my invention the detachable lugs 5 are shipped separate from the pipe and for ocean shipment the smaller sizes of pipe are telescoped into the larger pipe. The hangers 5 can be readily interlocked with the lugs 3 and when attached to the wall or support will hold or support the pipe as effectively as if cast integral therewith. As many hangers may be provided as the pipe requires and the cast lugs therefor on the pipe will not appreciably increase its cost nor interfere with its shipment. Moreover, if occasion arises to take down a stack, this can be done without disconnecting the attaching lugs, which is a practical advantage for my improved type of pipe hanger over present practice.

Having thus described my invention, what I claim as new and desire to secure by Letters Patent, is:—

1. A cast iron pipe having bell and spigot ends, a bead on the bell end, a plurality of homogeneous lugs cast integral with the pipe and disposed in longitudinal alinement thereon, one on the bell and one near the middle of the pipe, said lugs having their side edges undercut and projecting from the pipe a distance not exceeding the projection of the bead, and brackets having dove-tail sockets to receive the lugs and to support the pipe at a plurality of points when in horizontal position, substantially as described.

2. A cast iron pipe having bell and spigot ends, a bead surrounding the bell, a homogeneous lug cast on the bell flush with the bead which the lug joins, the side edges of the lug being undercut, and a support having a socket to receive the lug to support the pipe.

3. A cast iron pipe having a bell at one end, a pair of spaced beads surrounding said bell, one bead being interrupted, and an undercut downwardly tapering homogeneous lug cast on the bell flush with the continuous bead and extending therefrom to a point adjacent to and opposite the interruption in the other bead, and a bracket support having an undercut shoulder adapted to engage the lug, as and for the purposes described.

In testimony whereof I affix my signature.

OTTO AGRICOLA.

Copies of this patent may be obtained for five cents each, by addressing the "Commissioner of Patents, Washington, D. C."